(12) United States Patent
Chkodrov et al.

(10) Patent No.: US 8,214,847 B2
(45) Date of Patent: Jul. 3, 2012

(54) DISTRIBUTED MESSAGING SYSTEM WITH CONFIGURABLE ASSURANCES

(75) Inventors: Gueorgui Chkodrov, Redmond, WA (US); Richard D. Hill, Kirkland, WA (US); Craig A. Critchley, Fall City, WA (US); Krishnan Srinivasan, AndraPradesh (IN); Tihomir Tarnavski, Redmond, WA (US); Mitchell G. Morris, Sammamish, WA (US); Pramod Gurunath, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1019 days.

(21) Appl. No.: 12/163,572

(22) Filed: Jun. 27, 2008

(65) Prior Publication Data

US 2009/0133038 A1    May 21, 2009

Related U.S. Application Data

(60) Provisional application No. 60/988,735, filed on Nov. 16, 2007.

(51) Int. Cl.
*G06F 13/00* (2006.01)
*G06F 15/16* (2006.01)
*G01R 31/08* (2006.01)

(52) U.S. Cl. ........ 719/314; 709/230; 709/231; 709/232; 370/229

(58) Field of Classification Search ................ None
See application file for complete search history.

(56) References Cited

U.S. PATENT DOCUMENTS

| | | | |
|---|---|---|---|
| 5,377,350 A | 12/1994 | Skinner | |
| 5,465,251 A | 11/1995 | Judd et al. | |
| 5,786,771 A | 7/1998 | Fenney et al. | |
| 5,796,633 A * | 8/1998 | Burgess et al. | ............... 702/187 |
| 5,819,272 A | 10/1998 | Benson | |
| 5,826,269 A | 10/1998 | Hussey | |
| 5,870,556 A | 2/1999 | Cote et al. | |
| 5,872,930 A | 2/1999 | Masters et al. | |
| 5,951,648 A | 9/1999 | Kailash | |

(Continued)

FOREIGN PATENT DOCUMENTS

WO     9511560     4/1995

(Continued)

OTHER PUBLICATIONS

U.S. Appl. No. 12/263,878, Jan. 7, 2011, Notice of Allowance.

(Continued)

*Primary Examiner* — S. Sough
*Assistant Examiner* — Phuong Hoang
(74) *Attorney, Agent, or Firm* — Workman Nydegger (57) ABSTRACT

The present invention extends to methods, systems, and computer program products for configuring assurances within distributed messaging systems. A defined set of message log and cursor components are configurably activatable and deactivatable to compose a variety of different capture assurances, transfer assurances, and delivery assurances within a distributed messaging system. A composition of a capture assurance, a transfer assurance, and a delivery assurance can provide an end-to-end assurance for a messaging system. End-to-end assurances can include one of best effort, at-most-once, at-least-once, and exactly once and can include one of: durable or non-durable. Using a defined set of activatable and deactivatable message log and cursor components facilities more efficient transitions between desired assurances. In some embodiments, a composition of a capture assurance, a transfer assurance, and a delivery assurance provides durable exactly-once message delivery.

22 Claims, 4 Drawing Sheets

U.S. PATENT DOCUMENTS

| | | | |
|---|---|---|---|
| 5,951,695 | A | 9/1999 | Kolovson |
| 6,058,389 | A | 5/2000 | Chandra et al. |
| 6,205,498 | B1 | 3/2001 | Habusha et al. |
| 6,230,156 | B1 | 5/2001 | Hussey |
| 6,256,634 | B1 | 7/2001 | Moshaiov et al. |
| 6,336,135 | B1 | 1/2002 | Niblett |
| 6,339,794 | B2 | 1/2002 | Bolosky et al. |
| 6,446,144 | B1 | 9/2002 | Habusha et al. |
| 6,446,206 | B1 | 9/2002 | Feldbaum |
| 6,466,987 | B2 | 10/2002 | Bolosky et al. |
| 6,772,216 | B1 | 8/2004 | Ankireddipally et al. |
| 6,816,458 | B1 | 11/2004 | Kroon |
| 6,877,107 | B2 | 4/2005 | Giotta et al. |
| 6,970,945 | B1 | 11/2005 | Berkman et al. |
| 6,980,518 | B1 | 12/2005 | Sun et al. |
| 7,020,697 | B1 | 3/2006 | Goodman et al. |
| 7,050,432 | B1 | 5/2006 | Banavar et al. |
| 7,162,512 | B1 | 1/2007 | Amit et al. |
| 7,162,524 | B2 | 1/2007 | Astley et al. |
| 7,181,482 | B2 | 2/2007 | Jain et al. |
| 7,203,706 | B2 | 4/2007 | Jain et al. |
| 7,219,262 | B2 | 5/2007 | Miller et al. |
| 7,254,616 | B1 | 8/2007 | Ennis et al. |
| 7,287,066 | B2 * | 10/2007 | Ruggaber et al. ............. 709/220 |
| 7,525,964 | B2 | 4/2009 | Astley |
| 7,536,436 | B2 | 5/2009 | Kakivaya |
| 7,536,587 | B2 | 5/2009 | Vertes |
| 7,631,214 | B2 | 12/2009 | Bockhold |
| 7,668,961 | B2 | 2/2010 | Lomet |
| 7,941,808 | B2 | 5/2011 | Nikolov et al. |
| 8,055,711 | B2 | 11/2011 | Fachan et al. |
| 2001/0032232 | A1 | 10/2001 | Zombek et al. |
| 2002/0004812 | A1 | 1/2002 | Motoyama |
| 2002/0123966 | A1 | 9/2002 | Chu |
| 2003/0005117 | A1 | 1/2003 | Kang et al. |
| 2003/0023737 | A1 | 1/2003 | Johnson et al. |
| 2003/0110314 | A1 | 6/2003 | Barnes |
| 2004/0111652 | A1 | 6/2004 | Shoaib et al. |
| 2004/0136325 | A1 | 7/2004 | Dobric et al. |
| 2004/0139166 | A1 | 7/2004 | Collison |
| 2004/0205124 | A1 | 10/2004 | Limprecht et al. |
| 2004/0205781 | A1 | 10/2004 | Hill et al. |
| 2005/0021622 | A1 | 1/2005 | Cullen |
| 2005/0138112 | A1 | 6/2005 | Sagar et al. |
| 2005/0289414 | A1 | 12/2005 | Adya |
| 2006/0036679 | A1 | 2/2006 | Goodman et al. |
| 2006/0037069 | A1 | 2/2006 | Fisher |
| 2006/0080670 | A1 | 4/2006 | Lomet |
| 2006/0136256 | A1 | 6/2006 | Roots et al. |
| 2006/0146991 | A1 | 7/2006 | Thompson et al. |
| 2006/0168052 | A1 | 7/2006 | Srinivasan |
| 2007/0156808 | A1 | 7/2007 | Koegel et al. |
| 2007/0174233 | A1 | 7/2007 | Ginis et al. |
| 2007/0245018 | A1 | 10/2007 | Bhola et al. |
| 2007/0266392 | A1 | 11/2007 | Thoelke |
| 2008/0209007 | A1 | 8/2008 | Gurecki |
| 2009/0064182 | A1 | 3/2009 | Holar |

FOREIGN PATENT DOCUMENTS

| | | |
|---|---|---|
| WO | 0041365 | 7/2000 |
| WO | 2009037685 A1 | 3/2009 |

OTHER PUBLICATIONS

U.S. Appl. No. 12/263,878, Sep. 24, 2010, Office Action.
U.S. Appl. No. 12/263,891, Jan. 25, 2011, Notice of Allowance.
Eugster, Patrick Th., et al., "The Many Faces of Publish/Subscribe", ACM Computing Surveys, vol. 35, No. 2, Jun. 2003, pp. 114-131.
Joshi, Rajive, Real-Time Innovations, Inc., Embedded.com, "Building a effective real-time distributed publish-subscribe framework Part 1", Aug. 2006, 6 pages.
Slama, Dirk, et al., "Service Oriented Architecture: Inventory of Distributed Computing Concepts", Dec. 2004, 5 pages.
Zhao, Yuanyuan, et al., "Subscription Propagation in Highly-Available Publish/Subscribe Middleware", 2004, 20 pages.
Wikipedia, "Microsoft Message Queuing", 2009, 3 pages.
Orbix, "OrbixTalk MessageStore", 2002, 4 pages.
Johnson, Sender-Based Message Logging, 1987, 6 pages.
Office Action dated Dec. 8, 2008, cited in U.S. Appl. No. 10/401,649.
Notice of Allowance dated Jun. 11, 2009 cited in U.S. Appl. No. 10/401,649.
U.S. Appl. No. 10/401,649, Nov. 4, 2009, Notice of Allowance.
Bhola, Sumeer, et al., "Exactly-Once Delivery in a Content-Based Publish-Subscrbe System", 2002, 10 pages.
Bhola, Sumeer, et al., "Scalably Supporting Durable Subscriptions in a Publish/Subscribe System", Proceedings of the 2003 International Conference on Dependable Systems and Networks (DSN '03), 2003 IEEE, 10 pages.
Datasheet, "Sun Java System Message Queue Enterprise Edition", 2003, 6 pages.
Oracle9i Application Developer's Guide—Fundamentals, Release 2 (9.2), Part No. A96590-01, "Using the Publish-Subscribe Model for Applications", 2002, 8 pages.
Corsaro, Angelo, et al., "Quality of Service in Publish/Subscribe Middleware", IOS Press 2006, 19 pages.
Eugster, Patrick, et al., "Distributed Asynchronous Collections: Abstractions for Publish/Subscribe Interaction", 2000, 33 pages.
Hu, Songlin, et al., "Client Mobility in Distributed Content-Based Publish/Subscribe Systems", MSRG Technical Report, University of Toronto, Nov. 2007, 12 pages.
Lazar, Sashi; Weerakoon, Ishan; and Sidhu, Deepinder; "A Scalable Location Tracking and Message Delivery Scheme for Mobile Agents," Procceedings Seventh IEEE International Workshops on Enabling Technologies: Infrastructure for Collaborative Enterprises (WET ICE '98), Jun. 17-19, 1998, pp. 243-248.
Brzezinski, Jerzy; Kobusinska, Anna; and Kobusinski, Jacek; "Reliable Services for Distributed Environment," Proceedings International Conference on Parallel and Distributed Processing Techniques and Applications, Jun. 26-29, 2000, vol. V, pp. 2667-2673.
Horrell, Simon; "Microsoft Message Queue (MSMQ)," Enterprise Middleware, Jun. 1999, pp. 25-35.
Al-Jaber, Hessa and Rotenstreich, Shmuel; The Cascade Fault Tolerance Message System,: Seventeenth Annual ACM Computer Science Conference, Feb. 21-23, 1989, pp. 252-259.
Kausar, Nadia and Crowcroft, Jon; "End to End Reliable Multicast Transport Protocol Requirements for Collaborative Multimedia Systems," Proceedings Seventeenth IEEE Symposium on Reliable Distributed Systems, Oct. 20-23, 1998, pp. 425-430.
Kung, Roberto and Shacham, Nachum; "A Distributed Algorithm for Reliable Message Delivery Over a Sub-Network," GLOBECOM'87 IEEE/IEICE Global Telecommunications Conference 1987, Nov. 15-18, 1987, vol. 1, pp. 193-198.
Tai, Stephen; Mikalsen, Thomas; Rouvellou, Isabelle; Sutton, Stanley M. Jr.; "Conditional Messaging: Extending Reliable Messaging with Application Conditions," Proceedings 22nd International Conference on Distributed Computing Systems, Jul. 2-5, 2002, pp. 123-132.
Al-Jaber, Hessa and Rotenstreich, Shmuel, "Reliable Message Delivery Without Hard Backups," International Journal of Mini and Microcomputers, 1992, vol. 14, No. 3, pp. 117-124.
Jim Gray & Andreas Reuter, Transaction Processing: Concepts and Techniques (Bruce M. Spatz ed., Morgan Kaufmann Publishers, Inc. 1993).
Bilorusets, Ruslan, et al. Web Services Reliable Messaging Protocol (WS-ReliableMessaging) Bea, IBM, Microsoft and TIBCO Software, Mar. 13, 2003.
IBM, "Method of enabling automated invocation of web services", Research Disclosure, Mason Publishing, Mar. 2002.
Office Action for U.S. Appl. No. 10/401,649 mailed Mar. 3, 2008.
Office Action for U.S. Appl. No. 10/401,649 mailed Aug. 11, 2008.
Notice of Allowance dated Feb. 22, 2012 cited in U.S. Appl. No. 12/240,568.

* cited by examiner

DISTRIBUTED MESSAGING SYSTEM WITH CONFIGURABLE ASSURANCES

CROSS-REFERENCE TO RELATED APPLICATIONS

This application claims the benefit of U.S. Provisional Patent Application No. 60/988,735, entitled "STORAGE FOR DISTRIBUTED MESSAGE SYSTEMS", filed on Nov. 16, 2007, which is incorporated herein in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Distributed messaging systems can implement queuing and publish/subscribe ("pub/sub") message patterns. A queue is essentially a one-to-one consumer message exchange. A message producer inserts a message into the queue and a message consumer takes the message out of the queue. On the other hand, a pub/sub system is a one-to-many message exchange. A message producer publishes a message and multiple message consumers subscribe to and receive the published message.

Distributed messaging systems, including those that implement queuing and pub/sub patterns, are typically backed by a message store In these distributed messaging systems, the state of individual consumers who subscribe for messages from a topic or who consume from a queue is collocated with the message store. Consumers (e.g., user code applications) typically use distributed messaging systems to ensure that the message is delivered exactly once from the message log to the consumer. Consumers use transactions to retrieve messages because application state is inherently tied with the cursor state. Unfortunately, the use of transactions does not scale for large numbers of consumers receiving messages from a queue or topic.

Typical distributed messages systems also have a number of other limitations. For example, a distributed messages system is often tightly coupled to a limited number of, or even a single, network topology. Thus, there is limited, if any, ability to modify a distributed message system for use in other network topologies. For example, some distributed message systems cannot be used over a topology where consumers are separated from the queue or topic via a firewall.

Further, distributed messaging systems are typically limited in the message assurances they provide. For example, a distributed messaging system that provides best effort message delivery is generally not designed to ensure that no messages are ever dropped. Even distributed messaging systems that provide high assurances typically can not be modified to provide low assurances. For example, a distributed messaging system that provides exactly once assurances typically can not be easily modified to provide at most once, at least once, or best effort delivery.

Similar limitations are also associated with message durability within distributed messaging systems. That is, distributed messaging systems are typically limited in the type of message storage they provide. Further, similar to the limitations associated with assurances, even distributed messaging systems providing increased reliability of message storage can not be modified to provide lesser reliable message storage. For example, a distributed messaging system that provides durable message storage typically can not be easily modified to provide volatile or non-transaction message storage.

These assurance and message log limitations can be imposed due to the network topology of a distributed message system or can result from hard coded instructions within the software of the distributed message system. For example, a developer that designs a durable queue may have no reason (and from the perspective of his employer it may be a waste of resources) to include, or even consider, options for lesser reliable message storage. Likewise, a developer of a pub/sub messaging system with best effort delivery would waste significant resources adding options for more reliable message delivery, when the more reliable message delivery is not necessarily needed.

However, as with most computerized systems, the requirements of a distributed messaging system can change over time. For example, a distributed message system can gain more users, the types of users can change (e.g., moving from a freeware to a revenue model), government regulations can change, strategic business decisions can be made to cut costs, etc. In view of changed requirements, corresponding changes to message delivery assurances and message storage reliability may be warranted.

For example, when moving from freeware to a revenue model, customers may demand increased message delivery assurances (e.g., from best effort to exactly once). Alternately, to cut costs an IT department can determine it is more cost efficient to reduce message delivery assurances (e.g., from at least once to best effort). Another typical reason is the business application(s) running over the distributed message system may have been changed or replaced, resulting in a change of its requirements of the distributed messaging system. Similarly, the failure rate of the underlying network may have changed, making applying assurances at a higher-level less cost-efficient. Unfortunately, there is typically no efficient way to alter (either increase or decrease) existing message delivery assurances and message storage reliability in a distributed message system.

One option is to rebuild code to include desired delivery assurances and storage reliability mechanisms. However, this can be time consuming, costly and resource intensive for developers. Another option is to purchase a new distributed message system that includes the desired delivery assurance and storage reliability. However, this can also be costly and can lead to compatibility difficulties during integration with existing components and messages.

BRIEF SUMMARY

The present invention extends to methods, systems, and computer program products for configuring assurances within distributed messaging systems. A componentized messaging system facilitates configuring any of a variety of different capture protocols, transfer protocols, and delivery protocols to interact with one another to provide desired message assurances. Accordingly, a business can more efficiently configure (and change configuration of) their message system to align with (potentially varied and dynamic) business logic for the business.

In some embodiments, a componentized message system includes a message log and a cursor. Generally, the message log is configured to store messages. The message log also includes message log components for composing any of an extensible set of capture protocols to capture messages from message producers allowing the producers to hand-off a message to a distributed messaging system with different assurances and over different protocols. For example any request-response protocol can be used to achieve At-Least-Once (ALO) assurance. One way protocols, on the other hand, can only do At-Most-Once (AMO), because there is no feedback if a message is lost or a crash occurs. The extensible set of capture protocols can provide any of a variety of different message capture assurances from within a set of message capture assurances. Different message capture assurances are facilitated through the use of different combinations of message log components, including utilizing one or more of a durable store and transactions.

Generally, the cursor is configured to track the progress of consumers through messages in the message log. The cursor also includes cursor components for composing any of an extensible set of delivery protocols and/or message exchange patterns (MEPs) to deliver message to message consumers. MEPs typically identify who sends data to whom first and what the data contains (e.g. One-Way vs. Request-Reply). The delivery protocols indicate how the data appears on the wire (e.g. XML, byte-packets, etc.). The extensible set of delivery protocols can provide any of a variety of different message delivery assurances from within a set of message delivery assurances. Different message delivery assurances are facilitated through the use of different combinations of cursor components, including utilizing one or more of a durable store and transactions.

The message log and the cursor each also include further components for interoperating with one another to compose any of an extensible set of transfer protocols to transfer messages from the message log to the separate cursor. The extensible set of transfer protocols can provide any of a variety of different message transfer assurances from within a set of message transfer assurances. Different message transfer assurances are facilitated through the use of different combinations of message log and cursor components, including utilizing one or more of a time window and varying in the use of acknowledged delivery.

Accordingly, various combinations of capture assurances, transfer assurances, and delivery assurances can be combined to provide different end-to-end assurances, such as, for example, being either best effort, at-most-once, at-least-once or exactly once and either durable or volatile.

Additional features and advantages of the invention will be set forth in the as description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for configuring assurances within distributed messaging systems. A componentized messaging system facilitates configuring any of a variety of different capture protocols, transfer protocols, and delivery protocols to interact with one another to provide desired message assurances. Accordingly, a business can more efficiently configure (and change configuration of) their message system to align with (potentially varied and dynamic) business logic for the business.

In some embodiments, a componentized message system includes a message log and a cursor. Generally, the message log is configured to store messages. The message log also includes message log components for composing any of an extensible set of capture protocols to capture messages from message producers. The extensible set of capture protocols can provide any of a variety of different message capture assurances from within a set of message capture assurances. Different message capture assurances are facilitated through the use of different combinations of message log components, including utilizing one or more of a durable store and transactions.

Generally, the cursor is configured to track the progress of consumers through messages in the message log. The cursor also includes cursor components for composing any of an extensible set of delivery protocols to deliver message to message consumers. The extensible set of delivery protocols can provide any of a variety of different message delivery assurances from within a set of message delivery assurances. Different message delivery assurances are facilitated through the use of different combinations of cursor components, including utilizing one or more of a durable store and transactions.

The message log and the cursor each also include further components for interoperating with one another to compose any of an extensible set of transfer protocols to transfer messages from the message log to the separate cursor. The extensible set of transfer protocols can provide any of a variety of different message transfer assurances from within a set of message transfer assurances. Different message transfer assurances are facilitated through the use of different combinations of message log and cursor components, including utilizing one or more of a time window and varying in the use of acknowledged delivery.

Accordingly, various combinations of capture assurances, transfer assurances, and delivery assurances can be combined to provide different end-to-end assurances, such as, for example, best effort, at-most-once, at-least-once and exactly once.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transfer of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
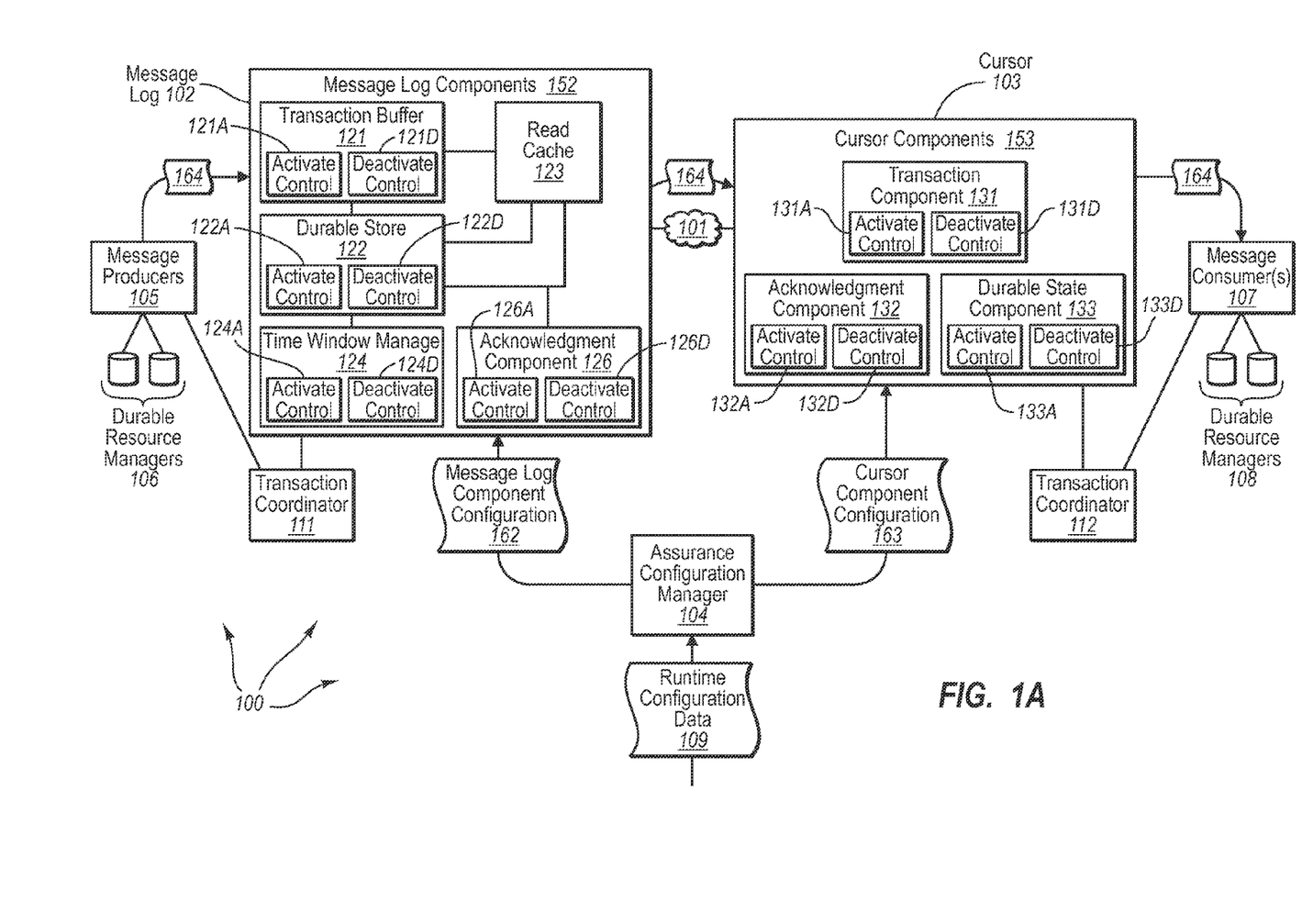
FIG. 1A illustrates an example computer architecture that facilitates configuring assurances within a distributed messaging system.

FIG. 1A illustrates an example computer architecture 100 that facilitates configuring assurances within a distributed messaging system. As depicted, computer architecture 100 includes message producers 105, durable resource managers 106, message log 102, cursor 103, durable resource managers 108, message consumer(s) 107, and assurance configuration manager 104. Each of the depicted computer systems can be connected to one another over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, message producers 105 send messages (e.g., message 164) to message log 102. The messages are based on resources from durable resources 106. Message log 102 invokes desired messaging behavior to store messages (with essentially no knowledge of potential message consumers), such as, for example, functioning as a queue or publisher in a pub/sub environment. When appropriate, messages (e.g., message 164) are sent from message log 102 over network 101 to cursor 103. Cursor 103 then invokes desired messaging behavior, such as, for example, receiving a queued message or functioning as a subscriber in a pub/sub environment. Cursor 103 then sends messages (e.g., message 164) to message consumer(s) 107, which can store the messages in durable resource managers 108 or perform other operations with message content. Cursor 103 can store the progress of a message consumer or group of message consumers in a message sequence.

Message log 102 and cursor 103 each include activatable and deactivatable components that can be activated and deactivated in various different combinations to compose desired message assurances or portions thereof. For example, message log components 152 include transaction buffer 121, read cache 123, durable store 122, time window manager 124, and acknowledgement component 126. Generally, message log components 152 can be activated and deactivated to compose any of an extensible set of capture protocols. Each capture protocol can be configured to provide a different capture assurance. For example, capture protocols can vary in the use of durable store 122 and participation in transactions involving transaction coordinator 111 to provide different capture assurances.

When activated, transaction buffer 121 keeps track of the messages for transactions that are in process. Transaction buffer 121 can enlist in a transaction as a volatile resource manager with the option to enlist as a durable resource manager during prepare ("EDPR"). When a message producer initiates commit, the transaction buffer receives prepare notification. Transaction buffer 121 can then enlist durable store 122 in the transaction (when activated) and save the message. When transaction buffer 121 receives committed it moves the messages to the read cache 123. Thus a message can be available on a short term bases without the need to read back from the Durable Store.

Similarly, cursor components 153 include transaction component 131, acknowledgement component 132, and durable store component 133. Generally, cursor components 153 can be activated and deactivated to compose any of an extensible set of delivery protocols. Each delivery protocol can be configured to provide a different delivery assurance. For example, delivery protocols can vary in the use of transaction component 131 and durable state component 133 to provide different delivery assurances. When activated, transaction component 131 and durable state component 133 function similarly to transaction buffer 121 and durable store 122 respectively to delivery a message to message consumer(s) 107.

Further, various message log components 152 and cursor components 153 can be activated and deactivated and interoperate to compose any of an extensible set of transfer protocols. Each transfer protocol can be configured to provide a different transfer assurance. For example, transfer protocols can vary in the used of acknowledgment components 126 and 132 and time window manager 124 to provide different transfer assurances.

For example, when activated, time window manager 124 can cause durable store 122 to keep a given window of messages (e.g., one day). Acknowledgement components 126 and 132 can interoperate to provide message acknowledgements from cursor 103 to message log 102. For example, when a message or range of messages is received at cursor 103, acknowledgement component 133 can acknowledge receipt of the message or range of messages to acknowledgement components 126. Upon receiving acknowledgment, appropriate messages can be discarded from message log 102. When activated, this interoperation causes durable store 122 to keep messages until acknowledged. Thus, there is an assurance that once a subscription is created a consumer is not likely to miss any messages.

Generally, assurance configuration manager 104 can send commands to message log 102 and cursor 103 to activate and deactivate appropriate components of message log components 152 and cursor components 153. Activation and deactivation of appropriate message log components 152 and cursor components 153 can result in composition of desired capture, transfer, and delivery protocols. The desired capture, transfer, and delivery protocols can then interoperate to provide desired end-to-end message assurance.

In some embodiments, assurance configuration manager 104 receives (e.g., system or other low-level) runtime configuration data 109. Runtime configuration data 109 indicates a combination of a capture assurance, a transfer assurance, and a delivery assurance that are to provide a desired end-to-end message assurance for message transfer in computer architecture 100.

From runtime configuration data 109, assurance configuration manager 104 can formulate a message log component configuration. A message log component configuration is for activating and deactivating appropriate message log components to compose the capture assurance and a first portion of the transfer assurance. For example, message log component configuration 162 is for activating and deactivating transaction buffer 121, durable store 122, time window manager 125, and acknowledgement component 126 to compose the capture assurance and a first portion of the transfer assurance that can interoperate with cursor components 153.

From runtime configuration data 109, assurance configuration manager 104 can also formulate a cursor component configuration. A cursor component configuration is for activating and deactivating appropriate cursor components to compose the delivery assurance and a second portion of the transfer assurance. For example, cursor component configuration 163 is for activating and deactivating transaction component 131, durable state component 133, and acknowledgement component 132 to compose the delivery assurance and the second portion of the transfer assurance that can interoperate with message log components 152.

Assurance configuration manager 104 can instruct components of as computer architecture 100 to compose the capture assurance, the transfer assurance, and the delivery assurance at the message log and cursor so as to implement the desired end-to-end message assurance. Assurance configuration manager 104 can send message log component configuration 162 to message log 102 to instruct message log 102 to compose the capture assurance and the first portion of the transfer assurance. Similarly, assurance configuration manager 104 can send cursor component configuration 163 to cursor 103 to instruct cursor 103 to compose the delivery assurance and the second portion of the transfer assurance.

As previous described, message log components and cursor components can be activate and deactivate to provide a desired end-to-end message assurance. In some embodiments, each component is individually activatable and deactivatable. For example, each component can include an activation control and a deactivation control. For example, at message log 102, transaction buffer 121 includes activation control 121A and deactivation control 121D, durable store 122 includes activation control 122A and deactivation control 122D, time window manager includes activation control 124A and deactivation control 124D, and acknowledgement component 126 includes activation control 126A and deactivation control 126D. Similarly, at cursor 103, transaction component 131 includes activation control 131A and deactivation control 131D, durable state component 133 includes activation control 133A and deactivation control 133D, and acknowledgement component 132 includes activation control 132A and deactivation control 132D. Individually activatable and deactivatable components provide a high degree of granularity. This granularity facilitates configuration of a wide variety of different sets of message capture assurances, message transfer assurances, and message delivery assurances.

As such, message log component configuration 162 can include instructions for individually activating and deactivating message log components 102. Similarly, cursor component configuration 163 can include instructions for individually activating and deactivating cursor components 103. In combination, message log component configuration 162 and cursor component configuration 163 instruct message log 102 and cursor 103 to provide desired end-to-end message assurance.

Figure 2:
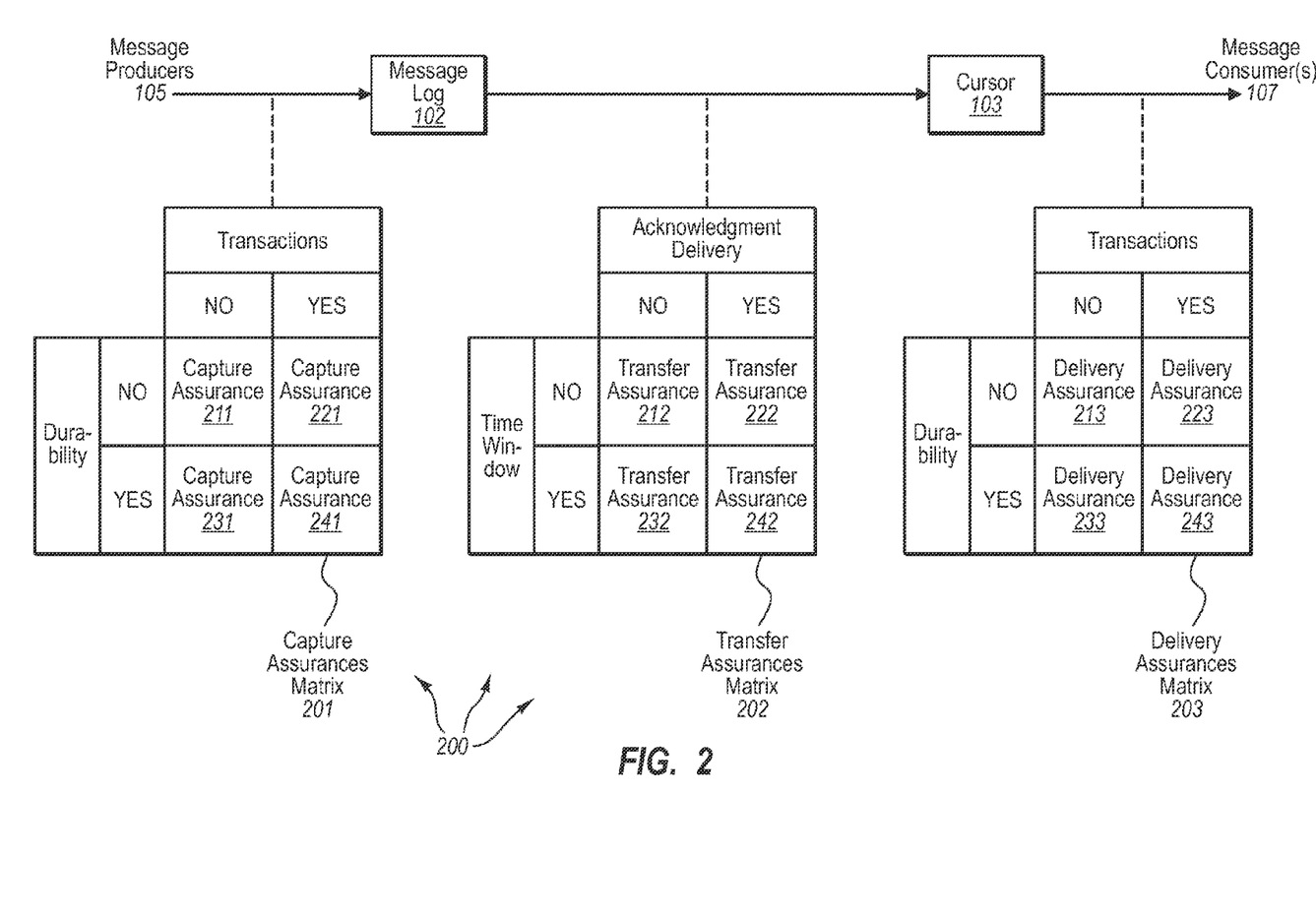
FIG. 2 illustrates various matrices of assurances that can be configurably composed for a distributed messaging system.

FIG. 2 illustrates various matrices 200 of assurances that can be configurably composed for a distributed messaging system. Matrices 200 will be described with reference to the components of computer architecture 100 in FIG. 1A.

Capture assurances matrix 201 represents an example of the properties of various different capture assurances message store 102 can use to capture messages from message producers 105. Within capture assurances matrix 201, each capture assurance indicates assurance properties that the capture assurance does or does not utilize. Each capture assurance can be implemented through the activation and deactivation of different combinations of message log components 152.

For example, capture assurance 211 does not utilize a durable store nor transactions. Thus, sending a message does not care about transactions and consumers can see messages despite commit/abort status of transactions. Further messages are lost when a crash or power failure occurs. Within computer architecture 100, capture assurance 211 can be implemented by deactivating durable store 122 and deactivating transaction buffer 121.

Capture assurance 221 does not utilize a durable store but does utilize transactions. Thus, consumers see messages for committed transactions (e.g., coordinated by transaction coordinator 111). However, messages are lost when a crash or power failure occurs. Within computer architecture 100, capture assurance 221 can be implemented by deactivating durable store 122 and activating transaction buffer 121.

Capture assurance 231 utilizes a durable store but does not utilize transactions. Thus, sending a message does not care about transactions and consumers can see messages despite commit/abort status of transactions. However, messages are durably stored (e.g., on disk) so that messages are not lost when a crash or power failure occurs. Within computer architecture 100, capture assurance 231 can be implemented by activating durable store 122 and deactivating transaction buffer 121.

Capture assurance 241 utilizes a durable store and transactions. Thus, consumers see messages for committed transactions and messages are not lost in case of a crash or power failure. Within computer architecture 100, capture assurance 241 can be implemented by activating durable store 122 and activating transaction buffer 121.

Transfer assurances matrix 202 represents an example of the properties of various different transfer assurances that can be used to transfer a message from message store 102 to cursor 103. Within transfer assurances matrix 202, each transfer assurance indicates assurance properties that the transfer assurance does or does not utilize. Each transfer assurance can be implemented through the activation and deactivation of different combinations of message log components 152 and cursor components 153.

For example, transfer assurance 212 does not utilize acknowledged delivery nor a time window. Transfer assurance 212 essentially represents best effort delivery. Within computer architecture 100, transfer assurance 212 can be implemented by deactivating time window manager 124 and deactivating acknowledgment components 126 and 132.

Transfer assurance 222 does utilize acknowledged delivery but does not utilize a time window. Transfer assurance 222 keeps message until acknowledged (potentially forever). Transfer assurance 222 provides assurance that once a subscription is created, a consumer is unlikely to miss a message. However, since no time window is utilized, a subscription can not obtain older messages. Within computer architecture 100, transfer assurance 222 can be implemented by deactivating time window manager 124 and activating acknowledgment components 126 and 132.

Transfer assurance 232 does not utilize acknowledged delivery but does utilize a time window. Transfer assurance 232 guarantees to keep given time window of messages (e.g. One Day). Thus, existing subscribers are not likely to miss messages unless they fall behind the online-window. New subscribers have a substantially high likelihood of receiving a given range of past messages. Within computer architecture 100, transfer assurance 232 can be implemented by activating time window manager 124 and deactivating acknowledgment components 126 and 132.

Transfer assurance 242 utilizes acknowledged delivery and utilizes a time window. Transfer assurance 242 is essentially a logical AND of transfer assurance 222 and transfer assurance 232. Thus, existing subscribers are not likely to miss messages and new subscribers have a substantial likelihood of receiving a given range as of past messages. Within computer architecture 100, transfer assurance 242 can be implemented by activating time window manager 124 and activating acknowledgment components 126 and 132.

Depending on the retention policy, message log 102 can behave differently when a quota is reached. For example, when utilizing transfer assurance 212, message log 102 can simply drop messages when a quota is reached. Message log 102 does not send error messages to message producers 105 when a message is dropped. As such, message producers 105 experience little if any delays.

When utilizing transfer assurances 222, 232, or 242, message log 102 can delay sending responses to producers to give further time for consumers to drain messages. Thus, message log 102 can compensate to some extent to avoid timeouts and message retries. However, message log 102 may eventually hit a timeout causing message producers to receive an error and possibly retry.

Delivery assurances matrix 203 represents an example of the properties of various different delivery assurances that can be used to transfer a message from cursor 103 to message consumer(s) 107. Within delivery assurances matrix 203, each delivery assurance indicates assurance properties that the delivery assurance does or does not utilize. Each delivery assurance can be implemented through the activation and deactivation of different combinations of cursor components 153.

For example, delivery assurance 213 does not utilize durable state nor transactions. Delivery assurance 213 essentially represents publish/subscribe functionality. Within computer architecture 100, delivery assurance 213 can be implemented by deactivating durable state component 133 and transaction component 131.

Delivery assurance 223 does not utilize durable state but does utilize transactions. Thus, consumers use volatile transactions as a mechanism to enforce atomic changes. Cursor 103 participates in transactions (e.g., coordinated by transaction coordinator 112) and provides exactly-once delivery into the state that is committed. Within computer architecture 100, delivery assurance 223 can be implemented by deactivating durable state component 133 and activating transaction component 131.

Delivery assurance 233 utilizes a durable state but does not utilize transactions. Thus, cursor 103 is durable but message consumer(s) 107 do not use transactions. The properties of the provided assurance can depend on the usage pattern (protocols) implemented between durable state component 133 and message consumers(s) 107. For example, a first usage pattern includes using a locking protocol to lock messages (and thus prevents other consumers from accessing the message) and an acknowledge protocol to inform the cursor that delivery has completed. In the first usage pattern, the consumer (107) utilizes the acknowledgment protocol as soon as it has received the message but before it has processed it. Subsequently, after message acknowledgement, the first usage pattern includes doing work based on the message. Message consumer(s) 107 using the first usage pattern are provided with At-Most-Once message delivery.

A second usage pattern includes using a locking protocol to lock messages and an acknowledge protocol to inform the cursor that delivery has completed. In the second usage pattern, the consumer (107), after doing work based on the message, includes using the acknowledgment protocol to inform the cursor that it has received the message. Message consumer(s) 107 using the second usage pattern are provided with At-Least-Once message delivery.

Within computer architecture 100, delivery assurance 233 can be implemented by activating durable state component 133 and deactivating transaction component 131. Different usage patterns (including the first and second usage patterns previously described) can provide delivery assurance 233 with different properties, such as, for example, At-Most-Once and At-Least-Once message delivery. In any event, delivery assurance 233 provides durable message state and recovery from a crash or power failure is likely.

Delivery assurance 243 utilizes durable state and transactions. Accordingly, delivery assurance 243 provides durable Exactly-Once delivery to message consumer(s) 107. Within computer architecture 100, delivery assurance 243 can be implemented by activating durable state component 133 and activating transaction component 131.

As previously described, various assurances can be expressed in (e.g., low-level) runtime configuration data. While possible, the runtime configuration data does not necessarily represent end-user intent. Since many end-users will lack a full understanding of the different assurances, a higher level model can provide protection from inefficient (e.g., wasted resources) or otherwise inappropriate combinations of assurances. For example, the higher level model can prevent the combination of a capture assurance that provides durable, transaction capture but a transfer assurance that is best-effort. The higher level model can utilize runtime configuration data for selecting appropriate combinations of assurances to provide an end-to-end assurance.

Figure 3:
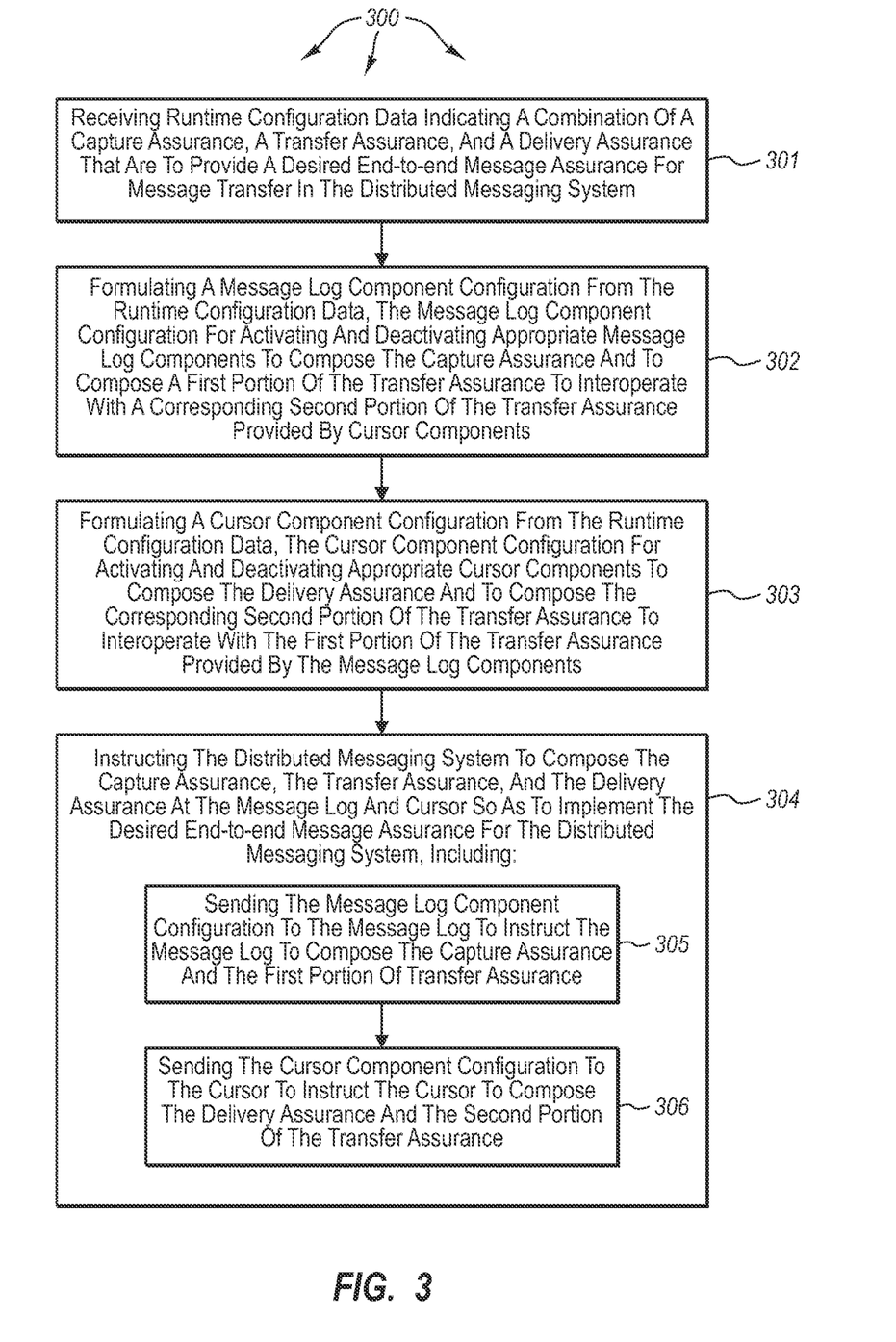
FIG. 3 illustrates a flow chart of an example method for configuring message assurances within a distributed message system.

FIG. 3 illustrates a flow chart of an example method 300 configuring message assurances within a distributed message system. The method 300 will be described with respect to the components and data depicted in computer architecture 100 in FIG. 1A.

Method 300 includes an act of receiving runtime configuration data indicating a combination of a capture assurance, a transfer assurance, and a delivery assurance that are to provide a desired end-to-end message assurance for message transfer in the distributed messaging system (act 301). For example, assurance configuration manger 104 can receive runtime configuration data 109. Runtime configuration data 109 can indicate a capture assurance, a transfer assurance, and a delivery assurance that are to provide a desired end-to-end message assurance for message transfer in computer architecture 100.

Method 300 includes an act of formulating a message log component configuration from the runtime configuration data, the message log component configuration for activating and deactivating appropriate message log components to compose the capture assurance and to compose a first portion of the transfer assurance to interoperate with a corresponding second portion of the transfer assurance provided by cursor components (act 302). For example, assurance configuration manager 104 can formulate message log component configuration 162. Message log component configuration 162 can include instructions for activating and deactivating appropriate message log components 152 to compose the capture assurance. Message log component configuration 162 can also include instructions for activating and deactivating appropriate message log components 152 to compose a first portion of the transfer assurance to interoperate with a corresponding second portion of the transfer assurance provided by cursor components 103.

Method 300 includes an act of formulating a cursor component configuration from the runtime configuration data, the cursor component configuration for activating and deactivating appropriate cursor components to compose the delivery assurance and to compose the corresponding second portion of as the transfer assurance to interoperate with the first portion of the transfer assurance provided by the message log components (act 303). For example, assurance configuration manager 104 can formulate cursor component configuration 163. Cursor component configuration 163 can include instructions for activating and deactivating appropriate cursor components 153 to compose the delivery assurance assurance. Cursor component configuration 163 can also include instructions for activating and deactivating appropriate cursor components 153 to compose the second portion of the transfer assurance to interoperate with the first portion of the transfer assurance provided by message log components 102.

Method 300 includes an act of instructing the distributed messaging system to compose the capture assurance, the transfer assurance, and the delivery assurance at the message log and cursor so as to implement the desired end-to-end message assurance for the distributed messaging system (act 304). For example, assurance configuration manger can instruct computer architecture 100 to compose the capture assurance, the transfer assurance, and the delivery assurance at the message log and cursor so as to implement the desired end-to-end message assurance for computer architecture 100.

Act 304 can include an act of sending the message log component configuration to the message log to instruct the message log to compose the capture assurance and the first portion of transfer assurance (act 305). For example, assurance configuration manager 104 can send message log component configuration 162 to message log 102 to instruct message log 102 to compose the capture assurance and the first portion of transfer assurance for computer architecture 100. Act 304 can also include an act of sending the cursor component configuration to the cursor to instruct the cursor to compose the delivery assurance and the second portion of the as transfer assurance (act 306). For example, assurance configuration manager 104 can send cursor component configuration 163 to cursor 103 to instruct cursor 103 to compose the delivery assurance and the second portion of transfer assurance for computer architecture 100.

Message log 102 and cursor 103 can implement the instructions of message log component configuration 162 and cursor component configuration 163 respectively. From the instructions, message log 102 and cursor 103 can activate and deactivate appropriate message log components 152 and cursor components 153 respectively to compose the capture assurance, the transfer assurance, and the delivery assurance. Together, the capture assurance, the transfer assurance, and the delivery assurances provide the desired end-to-end message assurance for computer architecture 100.

Figure 1B:
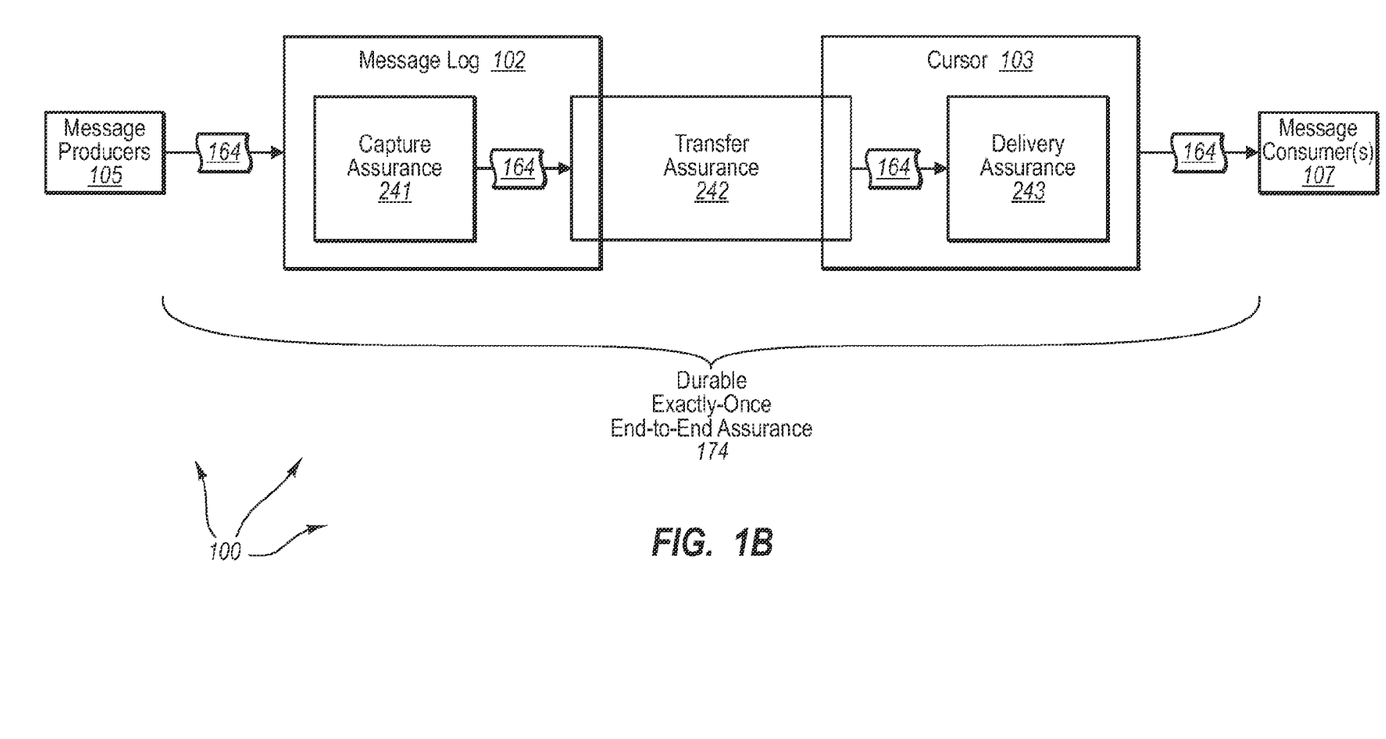
FIG. 1B illustrates an example computer architecture configured to provide durable exactly-once end-to-end message transfer assurance with a distributed messaging system.

Referring now to FIG. 1B, FIG. 1B illustrates computer architecture 100 configured to provide durable exactly-once end-to-end message transfer assurance. The assurances depicted in FIG. 1B can result from applying method 300 within computer architecture 100. As depicted, message log 102 composes capture assurance 241 to provide durable transaction-based message capture from message producers 105. Message log 102 and cursor 103 interoperate to compose transfer assurance 242 to provide time window retention and message acknowledgment transfer between message log 102 and cursor 103. Cursor 103 composes delivery assurance 243 to provide durable transaction based message delivery to message consumer(s) 107. Together, the composition of capture assurance 241, transfer assurance 242, and delivery assurance 243 provide durable exactly-once end-to-end assurance 174

As such, a message from message producers 105 (e.g., message 164) is essentially guaranteed to be received exactly once at message consumer(s) 107 even in the event of system crashes and/or power failures.

Accordingly, embodiments of the invention facilitate the configuration of a variety of different messaging assurances using a defined set of messaging components that are activatable and deactivatable. Embodiments of the invention can thus be implemented to simulate queues and publish/subscribe messaging systems having any of the variety of different messaging assurances. Since a defined set of components is used, configuring assurances and changing the configuration of assurances within of a messaging system is significantly more efficient.

Thus, embodiments of the present invention permit a business owner to balance the need for various message assurances against the cost to provide such message assurances. For example, resources can be conserved by using best effort or at-most once delivery when business rules do not require that a consumer receive every message (e.g., streaming media). Further, when business rules for a business change messaging systems can be more easily transitioned to comply with the new business rules. For example, to conserve resources, a messaging system can be transitioned from some other type of delivery assurance to best effort. On the other hand, if business rules transition to a revenue model, assurances can correspondingly be transitioned to insure that consumers (e.g., paying customers) get a message at least once.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A distributed messaging system comprising:
    a message log having one or more processors, system memory and message log components that compose capture protocols to capture messages from message producers; and
    a cursor having one or more processors, system memory and cursor components that compose delivery protocols to deliver messages to consumers;
    wherein the messaging system implements a method of configuring an end-to-end message assurance for message transfer from message providers to message consumers with the message log and the cursor and that includes:
    an act of receiving runtime configuration data indicating a combination of a capture assurance, a transfer assurance, and a delivery assurance that are to provide a desired end-to-end message assurance for a message transfer in the distributed messaging system;
    an act of formulating a message log component configuration from the runtime configuration data for activating and deactivating message log components to compose the capture assurance and to compose a first portion of the transfer assurance to interoperate with a corresponding second portion of the transfer assurance provided by the cursor components;
    an act of formulating a cursor component configuration from the runtime configuration data for activating and deactivating the cursor components to compose the delivery assurance and to compose the corresponding second portion of the transfer assurance to interoperate with the first portion of the transfer assurance provided by the message log components;
    an act of sending the message log component configuration to the message log to instruct the message log to compose the capture assurance and the first portion of transfer assurance; and
    an act of sending the cursor component configuration to the cursor to instruct the cursor to compose the delivery assurance and the second portion of the transfer assurance.

2. The messaging system of claim 1,
    wherein the message log components enable the composition of an extensible set of capture protocols to capture the messages from the message producers, the extensible set of capture protocols configured to provide any of a variety of different message capture assurances from within a set of message capture assurances, the set of message capture assurances varying in the use of a durable store and varying in the use of transactions; and
    wherein the cursor components enable the composition of an extensible set of delivery protocols to deliver the messages to the message consumers, the extensible set of delivery protocols configured to provide any of a variety of different message delivery assurances from within a set of message delivery assurances, the set of message delivery assurances varying in the use of a durable store and varying in the use of transactions.

3. The system as recited in claim 2, wherein the message log components for implementing an extensible set of capture protocols include:
    a transaction buffer, the transaction buffer configurably activatable and deactivatable to assist in composing a selected capture protocol, from among the set of extensible capture protocols, the transaction buffer activated to provide transactional behavior to the selected capture protocol and the transaction buffer deactivated to provide non-transactional behavior to the selected capture protocol; and
    a durable store, the durable store configurably activatable and deactivatable to assist in implementing the selected capture protocol, from among the set of extensible capture protocols, the durable store activated to provide durable storage to the selected capture protocol and the durable store deactivated to provide volatile storage to the selected capture protocol.

4. The system as recited in claim 3, wherein one of the transaction buffer and durable store is activated and one of the transaction buffer and durable store is deactivated.

5. The system as recited in claim 2, wherein the cursor components for implementing an extensible set of delivery protocols include:
    a transaction component, the transaction component configurably activatable and deactivatable to assist in composing a selected delivery protocol, from among the set of extensible delivery protocols, the transaction component activated to provide transactional behavior to the selected delivery protocol and the transaction component deactivated to provide non-transactional behavior to the selected delivery protocol; and
    a durable state component, the durable state component configurably activatable and deactivatable to assist in implementing the selected delivery protocol, from among the set of extensible delivery protocols, the durable state component activated to provide durable cursor state to the selected delivery protocol and the durable state component deactivated to provide volatile cursor state to the selected delivery protocol.

6. The system as recited in claim 5, wherein one of the transaction component and durable state component is activated and one of the transaction component and durable state component is deactivated.

7. The system as recited in claim 2, wherein the message log and the cursor components for interoperating with one another to implement an extensible set of transfer protocols include:

message acknowledgment components, the message acknowledgement components configurably activatable and deactivatable to assist in implementing a selected transfer protocol, from among the set of extensible transfer protocols, the message acknowledgment components activated to provide message acknowledgement behavior for the selected transfer protocol and the message acknowledgement components deactivated to prevent message acknowledgement behavior for the selected transfer protocol; and time window components, the time window components configurably activatable and deactivatable to assist in implementing the selected transfer protocol, from among the set of extensible transfer protocols, the time window components activated to provide retention of a window of messages for the selected transfer protocol and the time window components deactivated to prevent retention of a window of messages for the selected transfer protocol.

8. The system as recited in claim 7, wherein one of the message acknowledgment components and time window components is activated and one of the message acknowledgment components and time window components is deactivated.

9. The system as recited in claim 2, wherein the message log components and cursor components are configurably activated and deactivated to provide one of: best effort message delivery, at-most-once message delivery, at-least-once message delivery, and exactly-once message delivery.

10. The system as recited in claim 2, wherein the message log components and cursor components are configurably activated and deactivated to provide one of: durable message delivery or volatile message delivery.

11. The system as recited in claim 2, wherein the message log components and cursor components are configurably activated and deactivated to provide durable exactly-once message delivery.

12. The system of claim 1, wherein the message log components implement a durable transaction-based capture protocol for capturing the messages from the message producers, wherein the cursor components implement a durable transaction-based delivery protocol for delivering messages to message consumers.

13. The system as recited in claim 12, wherein the message storage components for implementing the durable transaction-based capture protocol include:

a transaction buffer, the transaction buffer configurably activatable and deactivatable to assist in implementing a selected capture protocol, from among the set of extensible capture protocols, the transaction buffer activated to provide transactional behavior for the durable transaction-based capture protocol; and a durable store, the durable store configurably activatable and deactivatable to assist in implementing the selected capture protocol, from among the set of extensible capture protocols, the durable store activated to provide durable storage for the durable transaction-based capture protocol.

14. The system as recited in claim 12, wherein the separate client-side components for implementing the durable transaction-based delivery protocol include:

a transaction component, the transaction component configurably activatable and deactivatable to assist in implementing a selected delivery protocol, from among the set of extensible delivery protocols, the transaction component activated to provide transactional behavior to the durable transaction-based delivery protocol; and a durable state component, the durable state component configurably activatable and deactivatable to assist in implementing the selected delivery protocol, from among the set of extensible delivery protocols, the durable state component activated to provide durable cursor state to the durable transaction-based delivery protocol.

15. The system as recited in claim 12, wherein interoperating components for implementing a transfer protocol providing message acknowledgment behavior and retention of a window of messages include:

message acknowledgment components, the message acknowledgement components configurably activatable and deactivatable to assist in implementing a selected transfer protocol, from among the set of extensible transfer protocols, the message acknowledgment components activated to provide message acknowledgement behavior for the selected transfer protocol; and time window components, the time window components configurably activatable and deactivatable to assist in implementing the selected transfer protocol, from among the set of extensible transfer protocols, the time window components activated to provide retention of a window of messages for the selected transfer protocol.

16. In a distributed messaging system including a message log and a cursor, a method for configuring an end-to-end message assurance for message transfer from message providers to message consumers, the method comprising:

an act of receiving runtime configuration data indicating a combination of a capture assurance, a transfer assurance, and a delivery assurance that are to provide a desired end-to-end message assurance for message transfer in the distributed messaging system;

an act of formulating a message log component configuration from the runtime configuration data, the message log component configuration for activating and deactivating appropriate message log components to compose the capture assurance and to compose a first portion of the transfer assurance to interoperate with a corresponding second portion of the transfer assurance provided by cursor components;

an act of formulating a cursor component configuration from the runtime configuration data, the cursor component configuration for activating and deactivating appropriate cursor components to compose the delivery assurance and to compose the corresponding second portion of the transfer assurance to interoperate with the first portion of the transfer assurance provided by the message log components; and an act of instructing the distributed messaging system to compose the capture assurance, the transfer assurance, and the delivery assurance at the message log and cursor so as to implement the desired end-to-end message assurance for the distributed messaging system, including:
an act of sending the message log component configuration to the message log to instruct the message log to compose the capture assurance and the first portion of transfer assurance; and
an act of sending the cursor component configuration to the cursor to instruct the cursor to compose the delivery assurance and the second portion of the transfer assurance.

17. The method as recited in claim 16, wherein the act of receiving runtime configuration data indicating a combination of a capture assurance, a transfer assurance, and a delivery assurance comprise receiving runtime configuration data indicating a combination of a capture assurance, a transfer assurance, and a delivery assurance that are to provide durable exactly-once message delivery.

18. The method as recited in claim 16, wherein an act of instructing the distributed messaging system to compose the capture assurance, the transfer assurance, and the delivery assurance at the message log and cursor so as to implement the desired end-to-end message assurance for the distributed messaging system comprises an act of instructing the distributed messaging system to compose the capture assurance, the transfer assurance, and the delivery assurance at the message log and cursor so as to implement the desired end-to-end message assurance for a message queuing system.

19. The method as recited in claim 16, wherein an act of instructing the distributed messaging system to compose the capture assurance, the transfer assurance, and the delivery assurance at the message log and cursor so as to implement the desired end-to-end message assurance for the distributed messaging system comprises an act of instructing the distributed messaging system to compose the capture assurance, the transfer assurance, and the delivery assurance at the message log and cursor so as to implement the desired end-to-end message assurance for a publish/subscribe messaging system.

20. The method as recited in claim 16, wherein an act of instructing the distributed messaging system to compose the capture assurance, the transfer assurance, and the delivery assurance at the message log and cursor so as to implement the desired end-to-end message assurance for the distributed messaging system comprises an act of instructing the distributed messaging system to compose the capture assurance, the transfer assurance, and the delivery assurance at the message log and cursor so as to implement one of: best effort message delivery, at-most-once message delivery, at-least-once message delivery, and exactly-once message delivery and one of: durable message delivery and volatile message delivery.

21. The method as recited in claim 16, further comprising
an act of the message log activating and deactivating the message log components as instructed in the message log component configuration to compose the capture protocol and the first portion of the transfer protocol; and
an act of the cursor activating and deactivating the cursor components as instructed in the cursor component configuration to compose the delivery protocol and the second portion of the transfer protocol.

22. One or more physical storage medium having stored instructions which, when executed by at least one computing system, implement a method comprising:
an act of receiving runtime configuration data indicating a combination of a capture assurance, a transfer assurance, and a delivery assurance that are to provide a desired end-to-end message assurance for a message transfer in the distributed messaging system;
an act of formulating a message log component configuration from the runtime configuration data for activating and deactivating appropriate message log components to compose the capture assurance and to compose a first portion of the transfer assurance to interoperate with a corresponding second portion of the transfer assurance provided by cursor components;
an act of formulating a cursor component configuration from the runtime configuration data for activating and deactivating appropriate cursor components to compose the delivery assurance and to compose the corresponding second portion of the transfer assurance to interoperate with the first portion of the transfer assurance provided by the message log components;
an act of sending the message log component configuration to a message log to instruct the message log to compose the capture assurance and the first portion of transfer assurance; and
an act of sending the cursor component configuration to the cursor to instruct the cursor to compose the delivery assurance and the second portion of the transfer assurance.

* * * * *